United States Patent
Chu et al.

(10) Patent No.: US 12,278,676 B2
(45) Date of Patent: Apr. 15, 2025

(54) ELECTRONIC DEVICE AND METHOD FOR OPERATING ANTENNA

(71) Applicant: Samsung Electronics Co., Ltd., Suwon-si (KR)

(72) Inventors: Duho Chu, Suwon-si (KR); Myeongsu Oh, Suwon-si (KR); Hojin Jung, Suwon-si (KR); Changmin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 257 days.

(21) Appl. No.: 18/160,582

(22) Filed: Jan. 27, 2023

(65) Prior Publication Data
US 2023/0170955 A1   Jun. 1, 2023

Related U.S. Application Data

(63) Continuation of application No. PCT/KR2021/009804, filed on Jul. 28, 2021.

(30) Foreign Application Priority Data

Jul. 31, 2020 (KR) .......................... 10-2020-0096328

(51) Int. Cl.
*H04B 7/06* (2006.01)
*H04B 1/44* (2006.01)
(Continued)

(52) U.S. Cl.
CPC ............ *H04B 7/0608* (2013.01); *H04B 1/44* (2013.01); *H04B 7/0404* (2013.01); *H04B 17/102* (2015.01); *H04M 1/0214* (2013.01)

(58) Field of Classification Search
CPC ...... H04B 7/0608; H04B 1/44; H04B 7/0404; H04B 17/102; H04B 1/401;
(Continued)

(56) References Cited

U.S. PATENT DOCUMENTS

| 7,400,872 B2 | 7/2008 | Kogure |
| 9,628,136 B2 | 4/2017 | Braun et al. |

(Continued)

FOREIGN PATENT DOCUMENTS

| JP | 4323381 B2 | 9/2009 |
| KR | 10-2016-0002794 A | 1/2016 |

(Continued)

OTHER PUBLICATIONS

European Search Report dated Nov. 24, 2023, issued in European Application No. 21850294.6.

(Continued)

*Primary Examiner* — Don N Vo
(74) *Attorney, Agent, or Firm* — Jefferson IP Law, LLP

(57) ABSTRACT

An electronic device is provided. The electronic device includes a first antenna, a second antenna segmented from the first antenna, a switch selectively coupled to the first antenna and the second antenna, a front end module connected to the switch, and a radio frequency (RF) communication circuit, wherein the RF communication circuit controls to communicate using the first antenna, determines whether radiation power through the first antenna is equal to or greater than a predetermined value, and if the radiation power through the first antenna is greater than or equal to the predetermined value, checks the in-phase quadrature phase (IQ) value of the first antenna, determines whether the IQ value corresponds to a switching condition of the second antenna, and if the IQ value corresponds to the switching condition of the second antenna, may switch the first antenna to the second antenna.

15 Claims, 14 Drawing Sheets

(51) Int. Cl.
*H04B 7/0404* (2017.01)
*H04B 17/10* (2015.01)
*H04M 1/02* (2006.01)

(58) Field of Classification Search
CPC .. H04M 1/0214; G06F 1/1616; G06F 1/1652; G06F 1/1698
USPC ............................................................ 455/78
See application file for complete search history.

(56) References Cited

U.S. PATENT DOCUMENTS

| | | | |
|---|---|---|---|
| 9,860,096 | B1 | 1/2018 | Ganwani et al. |
| 10,292,115 | B2 | 5/2019 | Yang et al. |
| 10,505,615 | B2 | 12/2019 | Islam et al. |
| 10,707,925 | B2* | 7/2020 | Park ..................... H04B 7/0413 |
| 2004/0110481 | A1* | 6/2004 | Navsariwala ............ H01Q 1/36 |
| | | | 455/269 |
| 2005/0272384 | A1 | 12/2005 | Kogure |
| 2006/0056357 | A1 | 3/2006 | Payne et al. |
| 2006/0290574 | A1* | 12/2006 | Tsai ....................... H01Q 1/243 |
| | | | 343/702 |
| 2007/0139282 | A1* | 6/2007 | Haruyama ............. H01Q 1/243 |
| | | | 343/702 |
| 2014/0327594 | A1 | 11/2014 | Zhang et al. |
| 2017/0373712 | A1 | 12/2017 | Kim et al. |
| 2019/0123786 | A1 | 4/2019 | Lee et al. |
| 2020/0127742 | A1 | 4/2020 | Seong et al. |
| 2020/0144713 | A1 | 5/2020 | Jung et al. |
| 2020/0220572 | A1* | 7/2020 | Kwon ................... H04B 1/0064 |
| 2021/0391926 | A1 | 12/2021 | Lee et al. |

FOREIGN PATENT DOCUMENTS

| | | |
|---|---|---|
| KR | 10-2019-0046184 A | 5/2019 |
| KR | 10-2020-0027302 A | 3/2020 |
| KR | 10-2020-0052611 A | 5/2020 |
| KR | 10-2334330 B1 | 12/2021 |
| WO | 2004/049594 A1 | 6/2004 |

OTHER PUBLICATIONS

Korean Office Action dated Dec. 4, 2024, issued in Korean Application No. 10-2020-0096328.

* cited by examiner

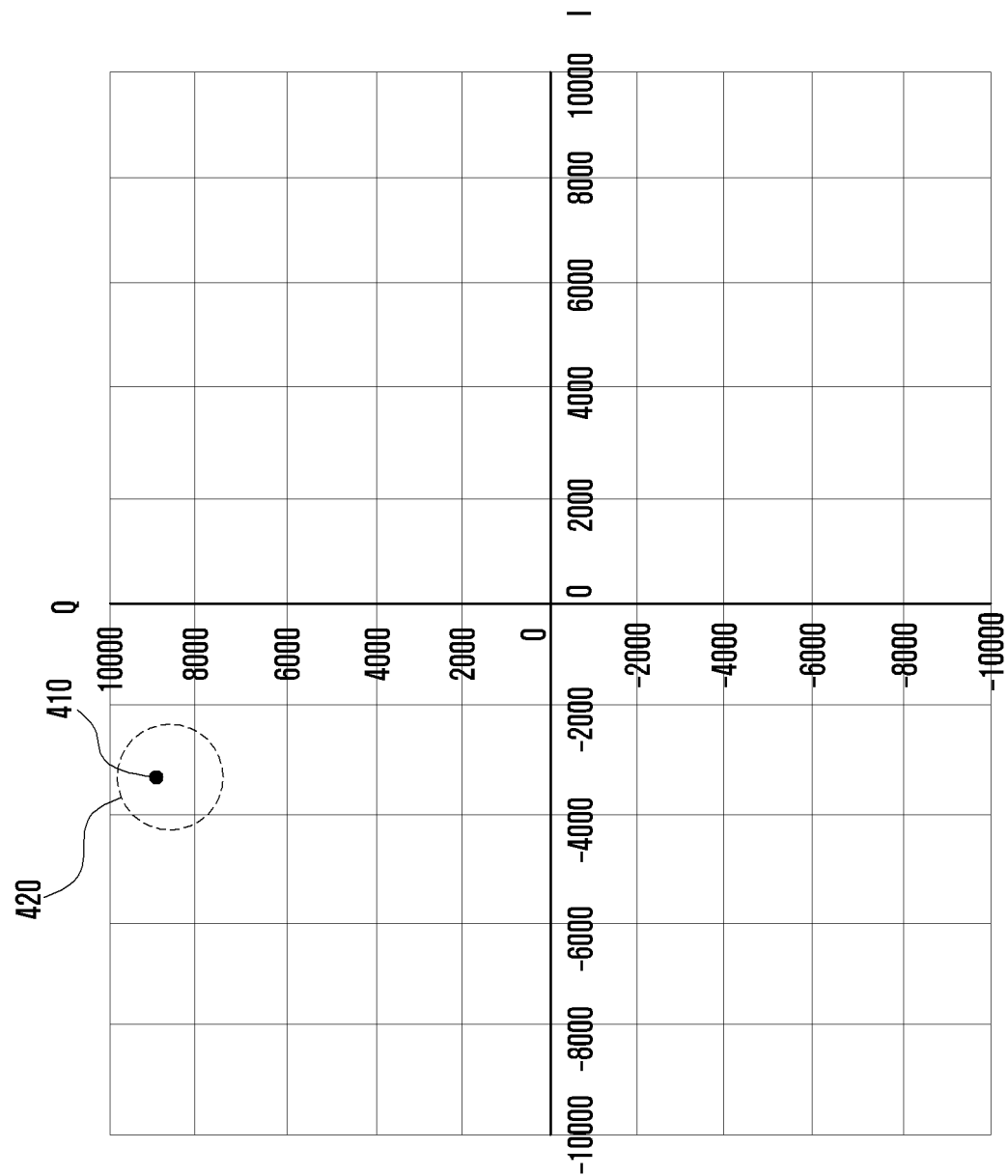

ELECTRONIC DEVICE AND METHOD FOR OPERATING ANTENNA

CROSS-REFERENCE TO RELATED APPLICATION(S)

This application is a continuation application, claiming priority under § 365(c), of an International application No. PCT/KR2021/009804, filed on Jul. 28, 2021, which is based on and claims the benefit of a Korean patent application number 10-2020-0096328, filed on Jul. 31, 2020, in the Korean Intellectual Property Office, the disclosure of which is incorporated by reference herein in its entirety.

BACKGROUND

1. Field

The disclosure relates to an electronic device and a method for operating an antenna of the electronic device.

2. Description of Related Art

With the development of mobile communication and hardware/software technology, portable electronic devices represented by a smartphone (hereinafter referred to as an electronic device) can be equipped with various functions through repeated evolution thereof. The electronic devices include a touch screen-based display so that a user can easily access various functions, and provide various application screens through the display.

Recently, in order to increase portability, a completely foldable display is being developed from a flexible display. An electronic device having such a foldable display may provide a large display area in an unfolded state, and the electronic device in a folded state may improve both usability and portability due to the reduced overall volume thereof.

The above information is presented as background information only to assist with an understanding of the disclosure. No determination has been made, and no assertion is made, as to whether any of the above might be applicable as prior art with regard to the disclosure.

SUMMARY

An electronic device including a recently introduced foldable display may include a plurality of antennas to secure performance. On the other hand, an electronic device including the foldable display may have a performance degradation problem caused by a user's grip.

Aspects of the disclosure are to address at least the above-mentioned problems and/or disadvantages and to provide at least the advantages described below. Accordingly, an aspect of the disclosure is to provide an electronic device and a method for operating an antenna of the electronic device that perform an antenna switching operation by identifying an in-phase, quadrature phase (IQ) value of a reflection signal of a radiation wave.

Additional aspects will be set forth in part in the description which follows and, in part, will be apparent from the description, or may be learned by practice of the presented embodiments.

In accordance with an aspect of the disclosure, an electronic device is provided. The electronic device includes a first antenna included in a first side surface of a housing and a portion of a second side surface of the housing, a second antenna segmented from the first antenna and included in the second side surface, a switch selectively coupled to the first antenna and the second antenna, a front end module connected to the switch, and a radio frequency (RF) communication circuit configured to transmit an RF signal to the first antenna and the second antenna or receive an RF signal through the first antenna and the second antenna, wherein the RF communication circuit is configured to perform control such that communication is performed using the first antenna, determine whether radiation power through the first antenna is equal to or greater than a predetermined value, when the radiation power through the first antenna is greater than or equal to the predetermined value, identify the IQ value of the first antenna, determine whether the IQ value corresponds to a switching condition of the second antenna, and when the IQ value corresponds to the switching condition of the second antenna, perform switching from the first antenna to the second antenna.

In accordance with another aspect of the disclosure, a method for operating an antenna of an electronic device is provided. The method includes performing control such that communication is performed using a first antenna, determining whether radiation power through the first antenna is greater than or equal to a predetermined value, identifying an IQ value of the first antenna when the radiation power through the first antenna is equal to or greater than a predetermined value, determining whether the IQ value corresponds to the switching condition of the second antenna, and performing switching from the first antenna to the second antenna when the IQ value corresponds to the switching condition of the second antenna.

An electronic device and a method for operating an antenna of the electronic device according to various embodiments of the disclosure may identify the IQ value and perform an antenna switching operation when the radiation performance of the electronic device is deteriorated, thereby preventing the radiation performance deterioration of the electronic device.

An electronic device and a method for operating an antenna of the electronic device according to various embodiments of the disclosure may identify the IQ value and perform an antenna switching operation when the radiation performance of the electronic device is deteriorated, thereby quickly performing an antenna switching operation with a simple configuration.

An electronic device and an antenna operating method of the electronic device according to various embodiments of the disclosure may perform an antenna switching operation by identifying an IQ value, instead of a conventional method of performing an antenna switching operation by identifying a received signal strength indication (RSSI) value, so as to identify only the pure antenna sensitivity, thereby performing an antenna switching operation in an accurate situation with less environmental influence such as surrounding noise.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 illustrates antenna switching conditions according to IQ values according to an embodiment of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
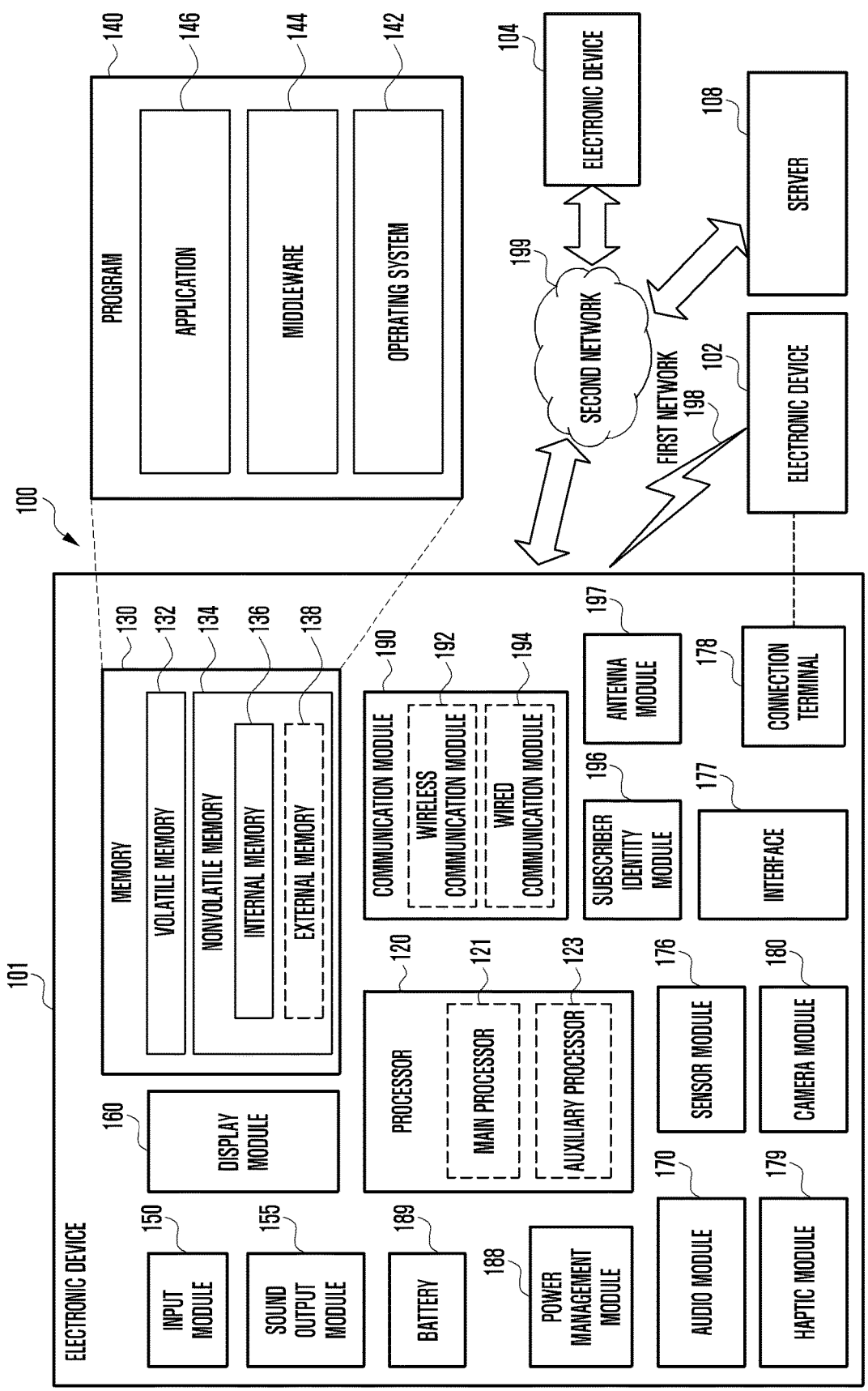
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
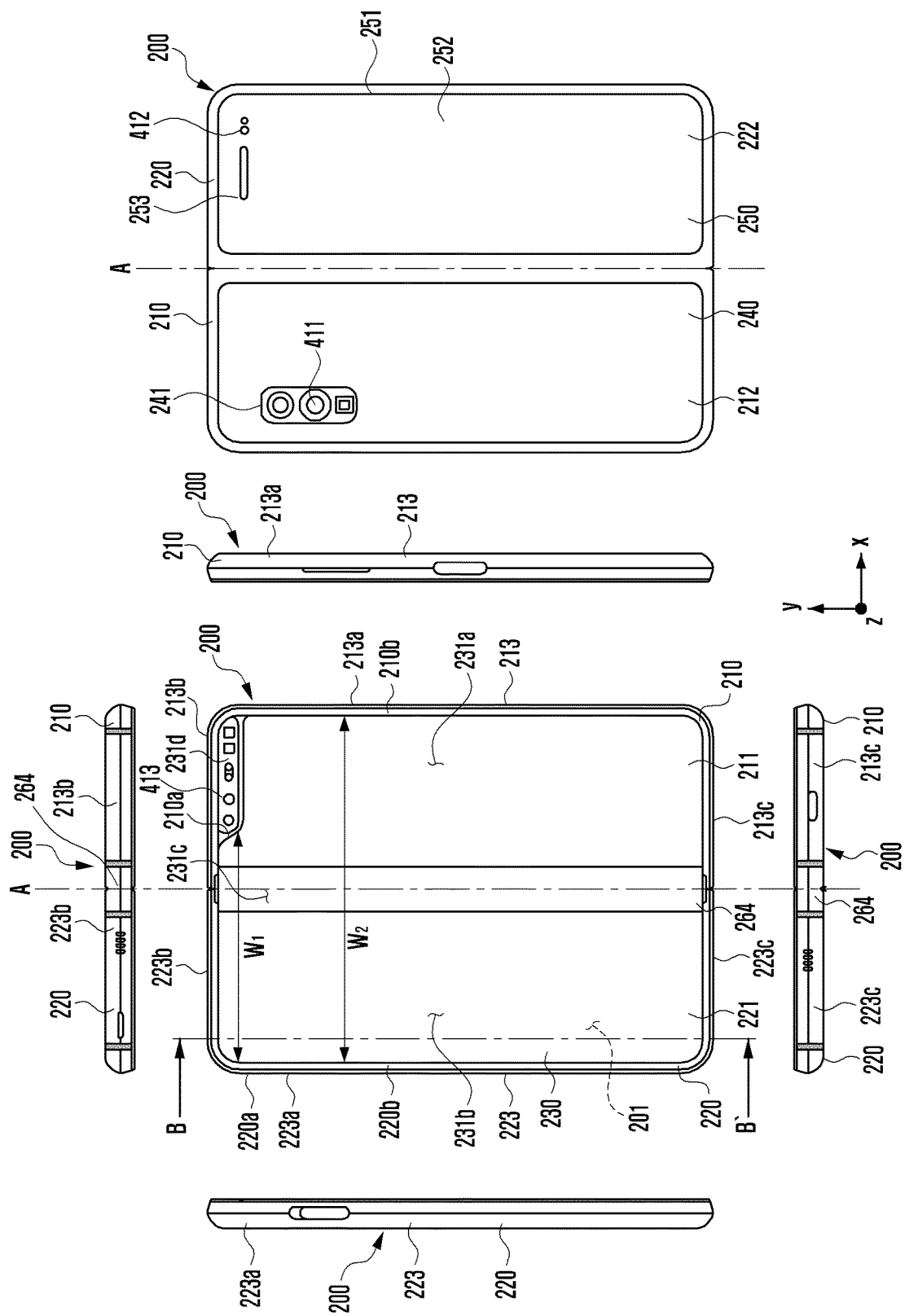
FIG. 2A illustrates a flat state of an electronic device according to an embodiment of the disclosure.
Figure 2B:
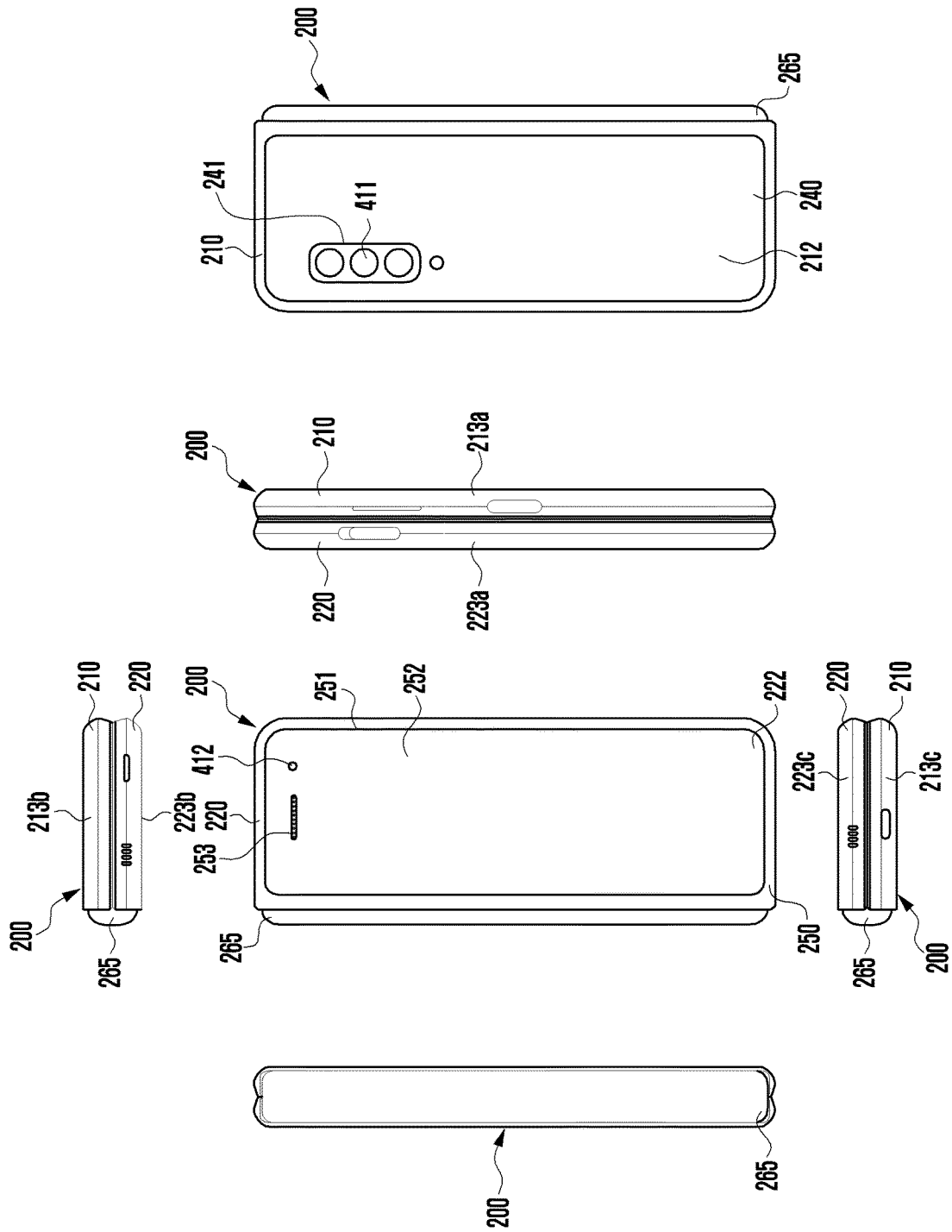
FIG. 2B illustrates a folded state of the electronic device of FIG. 2A according to an embodiment of the disclosure.

FIG. 2A illustrates a flat state of an electronic device according to an embodiment of the disclosure. FIG. 2B illustrates a folded state of the electronic device of FIG. 2A according to an embodiment of the disclosure.

Referring to FIG. 2A, the electronic device 200 (e.g., the electronic device 101 in FIG. 1) may include a first housing structure 210 and a second housing structure 220 including at least one space in which at least one display may be disposed, at least one display 230 (e.g., a flexible display, a foldable display, or a first display) disposed in the at least one space, a second display (e.g., a sub-display) disposed on one side surface of the second housing structure 220, a hinge structure configured such that the first housing structure 210 and the second housing structure 220 are folded relative to each other, and a hinge cover 265 configured to cover foldable portions of the first housing structure 210 and the second housing structure 220. In this document, the surface on which the first display 230 is disposed may be defined as a front surface of the electronic device 200, and the surface opposite to the front surface may be defined as a rear surface of the electronic device 200. In addition, the surface surrounding the space between the front surface and the rear surface may be defined as a side surface of the electronic device 200.

In an embodiment, the pair of housing structures 210 and 220 may include the first housing structure 210 including a sensor region 231*d*, the second housing structure 220, a first rear cover 240, and a second rear cover 250. The pair of housing structures 210 and 220 of the electronic device 200 are not limited to the shapes and combinations shown in FIGS. 2A and 2B, and may be implemented by other shapes or combinations and/or combinations of parts. For example, in another embodiment, the first housing structure 210 and the first rear cover 240 may be integrally formed with each other, and the second housing structure 220 and the second rear cover 250 may be integrally formed with each other.

According to an embodiment, the first housing structure 210 and the second housing structure 220 may be configured as a single housing (not shown), the folded portion of the single housing may be formed of a flexible material (not shown), and the hinge structure 264 may not be configured separately and be replaced with a flexible material. According to an embodiment, the first housing structure 210 and the second housing structure 220 may disposed on both sides with a folding axis (axis A) interposed therebetween, and may be folded or unfolded around the folding axis (axis A). According to an embodiment, the first housing structure 210 and the second housing structure 220 may form different angle and distance according to whether the electronic device 200 is in a flat state or an open state, in a folding state, or in an intermediate state. At least a partial region of the first housing structure 210 or the second housing structure 220 may include a sensor region 231d where various sensors are disposed. In another embodiment, the sensor region 231d may be additionally disposed in at least a partial region of the second housing structure 220 or may also be replaced.

According to an embodiment, an angle formed between the first housing structure 210 and the second housing structure 220 may be adjusted by the hinge structure. According to an embodiment, the electronic device 200 may be in a flat state when the first housing structure 210 and the second housing structure 220 face the same surface (e.g., the front surface) or are parallel to the same axis (X-axis). According to an embodiment, the electronic device 200 may include the first display 230 disposed in a space formed by the first housing structure 210 and the second housing structure 220, the first display 230 may include a first surface 211 and a third surface 221, and a flexible region that may be bent at a predetermined angle may be formed between the first surface 211 and the third surface 221. According to an embodiment, the first display 230 having at least a bendable partial region may include a region which is bendable in various shapes, other than the first surface 211 and the third surface 221, and the bendable region may not be limited to one region. According to various embodiments, the hinge structure (e.g., 264 in FIG. 3A) may be disposed in a bendable region of the first display 230, and when the first display 230 is bent, may support the first display 230 such that the same maintains a predetermined angle while being bent.

According to an embodiment, the first housing structure 210 may include a first surface 211 disposed to face forwards, a second surface 212 facing the opposite direction of the first surface 211, and a first lateral member 213 surrounding at least a portion of the space between the first surface 211 and the second surface 212. In an embodiment, the first lateral member 213 may include a first side surface 213a disposed parallel to the folding axis (axis A), a second side surface 213b extending from one end of the first side surface 213a in a direction perpendicular to the folding axis, and a third side surface 213c extending from the other end of the first side surface 213a in a direction perpendicular to the folding axis (axis A).

In an embodiment, the second housing structure 220 may include at least a portion of the second housing structure 220 connected to the hinge structure and may include a third surface 221 disposed to face the front surface of the electronic device 200, a fourth surface 222 facing the opposite direction of the third surface 221, and a second lateral member 223 surrounding at least a portion of the space between the third surface 221 and the fourth surface 222. In an embodiment, the second lateral member 223 may include a fourth side surface 223a disposed parallel to the folding axis (axis A), a fifth side surface 223b extending from one end of the fourth side surface 223a in a direction perpendicular to the folding axis (axis A), and a sixth side surface 223c extending from the other end of the fourth side surface 223a in a direction perpendicular to the folding axis (axis A). In an embodiment, the third surface 221 may face the first surface 211 in a folded state.

In an embodiment, the electronic device 200 may a recess 201 formed to accommodate the first display 230, at least partially of which is bendable through a structural combination of the first housing structure 210 and the second housing structure 220. According to an embodiment, the recess 201 may have substantially the same size as the first display 230. In an embodiment, due to the sensor region 231d, the recess 201 may have two or more different widths in a direction perpendicular to the folding axis (axis A). For example, the recess 201 may have a first width (W1) formed between a first portion 220a of the second housing structure 220 and a first portion 210a formed at the periphery of the sensor region 231d of the first housing structure 210, and may have a second width (W2) by a second portion 220b of the second housing structure 210 and a second portion 210b which is parallel to the folding axis (axis A) and does not correspond to the sensor region 213d of the first housing structure 210. According to various embodiments, the width of the recess 201 may not be limited to the illustrated example. According to various embodiments, the recess 201 may have two or more different widths or may also have the same width.

In an embodiment, at least a portion of the first housing structure 210 and the second housing structure 220 may be formed of a metal material or a non-metal material having a stiffness having a magnitude selected to support the first display 230.

In an embodiment, the sensor region 231d may be formed to have a predetermined region to be adjacent to one corner of the first housing structure 210. However, the arrangement, shape, or size of the sensor region 231d may not be limited to the illustrated example. According to various embodiments, at least one of a front camera device 413, a receiver, a proximity sensor, an ultrasonic sensor, a gesture sensor, a gyro sensor, a pressure sensor, a magnetic sensor, an acceleration sensor, a grip sensor, a color sensor, an infrared (IR) sensor, a biosensor, a temperature sensor, a humidity sensor, or an indicator may be disposed in at least a partial region of the sensor region 231d. In various embodiments, the parts may be disposed inside an electronic device without having a separate sensor region. For example, at least some of the parts may be disposed under the first display 230 or may be viewed through a partial region of the first display 230.

In an embodiment, the first rear cover 240 may be disposed on the second surface 212 of the first housing structure 210 and may have a substantially rectangular periphery. In an embodiment, at least a portion of the periphery may be wrapped by the first housing structure 210. Similarly, the second rear cover 250 may be disposed on the fourth surface 222 of the second housing structure 220, and at least a portion of its periphery may be wrapped by the second housing structure 220.

In the illustrated embodiment, the first rear cover 240 and the second rear cover 250 may have substantially symmetrical shapes with respect to the folding axis (axis A). In another embodiment, the first rear cover 240 and the second rear cover 250 may include various shapes different from each other. In another embodiment, the first rear cover 240 may be integrally formed with the first housing structure 210, and the second rear cover 250 may be integrally formed with the second housing structure 220.

In an embodiment, a structure in which the first rear cover 240, the second rear cover 250, the first housing structure 210, and the second housing structure 220 are combined with each other may provide a space in which various parts (e.g., a printed circuit board, an antenna module, a sensor module, or a battery) of the electronic device 200 may be disposed. In an embodiment, one or more parts may be disposed on or visually seen through the rear surface of the electronic device 200. For example, one or more parts or sensors may be visually seen through the first rear region 241 of the first rear cover 240. In various embodiments, the sensor 411 may include a proximity sensor, a rear camera device, and/or a flash. In another embodiment, at least a portion of the sub-display 252 (e.g., the second display) may be visually seen through the second rear region 251 of the second rear cover 250. In another embodiment, the electronic device 200 may include a speaker module 253 disposed through at least a partial region of the second rear cover 250.

The first display 230 may be disposed in a space formed by the first and second housing structures 210 and 220. For example, the first display 230 may be stably placed in the recess 201 formed by the first and second housing structures 210 and 220 and may be disposed to substantially occupy most of the front surface of the electronic device 200. Accordingly, the front surface of the electronic device 200 may include the first display 230, and a partial region (e.g., a periphery region) of the first housing structure 210 and a partial region (e.g., a periphery region) of the second housing structure 220, which are adjacent to the first display 230. In an embodiment, the rear surface of the electronic device 200 may include the first rear cover 240, a partial region (e.g., a periphery region) of the first housing structure 210 adjacent to the first rear cover 240, the second rear cover 250, and a partial region (e.g., a periphery region) of the second housing structure 220 adjacent to the second rear cover 250.

In an embodiment, the first display 230 may refer to a display, at least a partial region of which may be changed into a flat or curved surface. In an embodiment, the first display 230 may include a folding region 231c, a first region 231a disposed at one side (e.g., the right side region of the folding region 231c) with respect to the folding region 231c, and a second region 231b disposed at the other side (e.g., the left side region of the folding region 231c) with respect to the folding region 231c. For example, the first region 231a may be disposed on the first surface 211 of the first housing structure 210, and the second region 231b may be disposed on the third surface 221 of the second housing structure 220. In an embodiment, the region division of the first display 230 is an example, and the first display 230 may be divided into a plurality of regions (e.g., four or more or two) according to a structure or a function thereof. For example, in the embodiment shown in FIG. 2A, the region of the first display 230 may be divided by the folding region 231c or the folding axis (A-axis) extending parallel to the y-axis, but in another embodiment, the region of the first display 230 may also be divided, based on another folding region (e.g., a folding region parallel to the x-axis) or another folding axis (e.g., a folding axis parallel to the x-axis). The region division of the display described above is only a physical division by the pair of housing structures 210 and 220 and the hinge structure, and substantially, one entire screen may be displayed on the first display 230 through the pair of housing structures 210 and 220 and the hinge structure. In an embodiment, unlike the second region 231b, the first region 231a may include a notch region, which is a cut region, formed according to the existence of the sensor region 231d. In an embodiment, the first region 231a and the second region 231b may include portions having shapes symmetrical to each other and portions having shapes asymmetrical to each other.

Referring to FIG. 2B, the hinge cover 265 may be disposed between the first housing structure 210 and the second housing structure 220 to cover internal parts. In an embodiment, the hinge cover 265 may be covered or visible from the outside by a portion of the first housing structure 210 and the second housing structure 220 according to an operating state (e.g., a flat state or a folded state) of the electronic device 200.

Hereinafter, the operation of the first housing structure 210 and the second housing structure 220 according to the operating state (e.g., a flat state and a folded state) of the electronic device 200 and each region of the first display 230 will be described.

In an embodiment, when the electronic device 200 is in a flat state (e.g., the state in FIG. 2A), the first housing structure 210 and the second housing structure 220 may form a straight angle (e.g., 180 degrees). In the flat state (e.g., a first designated state), the first region (e.g., 231a in FIG. 2A) and the second region (e.g., 231b in FIG. 2A) of the display may face the same direction. In addition, when the electronic device is in the flat state, the folding region (e.g., 231c in FIG. 2A) may form the same plane as the first region 231a and the second region 231b. In another embodiment, when the electronic device 200 is in a flat state, the first housing structure 210 and the second housing structure 220 may also be reversely folded such that the second surface 212 and the fourth surface 222 face each other, for example, by the second housing structure 220 rotating 360 degrees with respect to the first housing structure.

In an embodiment, when the electronic device 200 is in an intermediate state, the first housing structure 210 and the second housing structure 220 may be disposed at a predetermined angle (e.g., between 10 degrees and 90 degrees). The first region (e.g., 231a in FIG. 2A) and the second region (e.g., 231b in FIG. 2A) of the first display 230 may form an angle greater than that in the flat state and smaller than that in the unfolded state. At least a portion of the folding region (e.g., 231c in FIG. 2A) may include a curved surface having a predetermined curvature, and the curvature at this time may be smaller than that in the folded state.

In an embodiment, when the electronic device 200 is in a folded state (e.g., the state in FIG. 2B or a third designated state), the first housing structure 210 and the second housing structure 220 may be placed to face each other. The first region (e.g., 231a in FIG. 2A) and the second region (e.g., 231b in FIG. 2A) of the first display 230 may form an acute angle (e.g., between 0 degrees and 10 degrees), and may be placed to face each other. At least a portion of the folding region (e.g., 231c in FIG. 2A) may include a curved surface having a predetermined curvature.

Figure 3A:
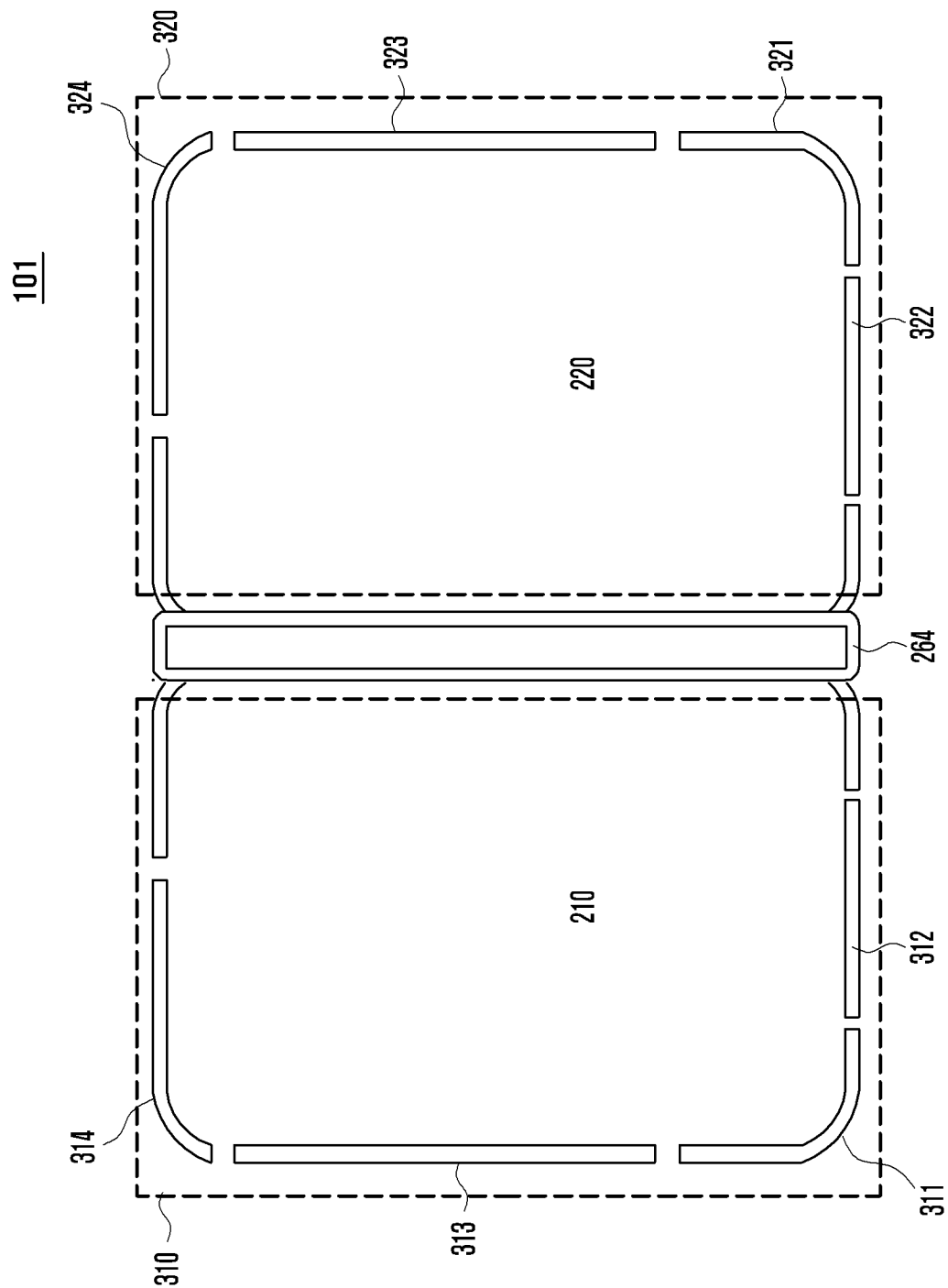
FIG. 3A illustrates a plurality of antenna members of an electronic device according to an embodiment of the disclosure.

FIG. 3A illustrates a plurality of antenna members 310 and 320 of the electronic device 101 according to an embodiment of the disclosure.

In various embodiments, the electronic device 101 may include a first housing structure 210, a second housing structure 220, and a hinge structure 264. The first housing structure 210 may be connected to the second housing structure 220 through the hinge structure 264. The electronic device may replace the hinge structure 264 with a flexible material without separately including the same. The first housing structure 210 and the second housing structure 220 may be folded or unfolded around the hinge structure 254.

In various embodiments, each of the plurality of antenna members 310 and 320 included in the electronic device 101 may include a plurality of segmented antennas.

In various embodiments, the first antenna member 310 may include a first antenna 311, a second antenna 312, a third antenna 313, and a fourth antenna 314.

In various embodiments, the second antenna member 320 may include a fifth antenna 321, a sixth antenna 322, a seventh antenna 323, and an eighth antenna 324.

In various embodiments, the segmented first antenna 311, second antenna 312, fourth antenna 314, and fifth antenna 315 may be coupled to each other through an insulation member.

In various embodiments, the segmented fifth antenna 321, sixth antenna 322, seventh antenna 323, and eighth antenna 324 may be coupled to each other through an insulation member.

In various embodiments, the first antenna 311 and/or the second antenna 312 may operate as a main antenna of the first communication network of the electronic device 101.

In various embodiments, the first antenna 311 may have the shape of a capital letter L and may be disposed on at least a portion of the fourth side surface 223a and at least a portion of the sixth side surface 223c of the electronic device 101. The first antenna 311 may use a band of 600 to 960 MHz as a resonant frequency. The first antenna 311 as PRX may support at least one network frequency band of code division multiple access (CDMA) BC0/BC10, global system for mobile communication (GSM) 850/900, wideband CDMA (WCDMA) 5/6/8/19, long term evolution (LTE) 5/8/12/13/14/17/18/19/20/26/28/29/71, or NR 5/8/12/28/71.

In various embodiments, the second antenna 312 may be adjacent to the first antenna 311 and be disposed on at least a portion of the sixth side surface 223c.

In various embodiments, the second antenna 312 may use a band of 1710 to 4200 MHz as a resonant frequency. The second antenna 312 may support, as PRX, at least one network frequency band of CDMA BC1, digital cellular system (DCS)/personal communications service (PCS), WCDMA 1/2/4, LTE 1/2/3/4/7/25/30/34/38/39/40/41/66, or NR 1/2/3/7/25/40/66, may support, as discontinuous reception (DRX), NR 41, and may support, as MIMO, at least one network frequency band of LTE 42/48 or NR 77/78.

In various embodiments, the third antenna 313 and the fourth antenna 314 may operate as sub-antennas of the first communication network of the electronic device 101.

In various embodiments, the eighth antenna 324 may operate as an antenna of the second communication network. The first communication network may be, for example, a 5G and/or 4G communication network, and the second communication network may be, for example, a wireless local area network (WLAN) communication network (Wi-Fi).

Figure 3B:
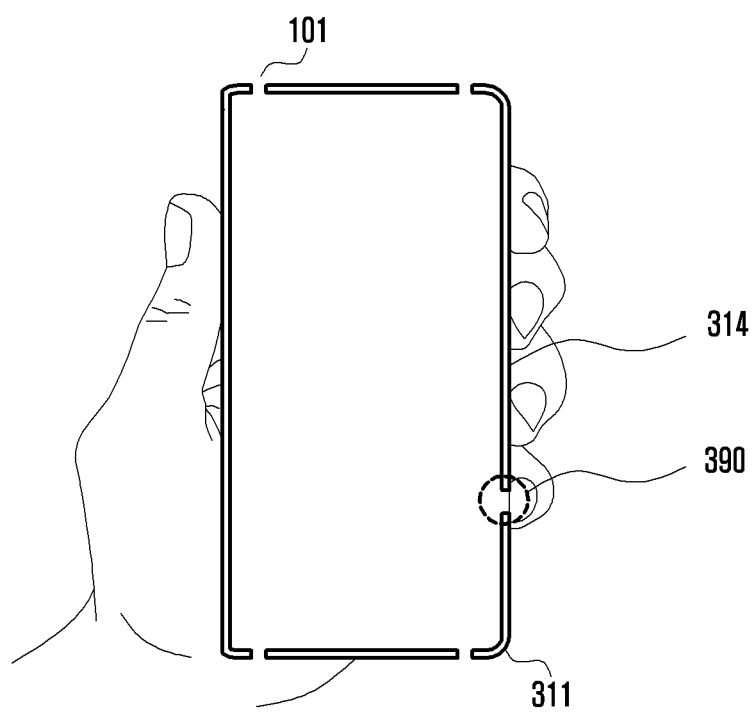
FIG. 3B illustrates an antenna segment of an electronic device, which is gripped by a user, according to an embodiment of the disclosure.

FIG. 3B illustrates the antenna segment 390 of the electronic device 101, which is gripped by a user, according to an embodiment of the disclosure.

Figure 3C:
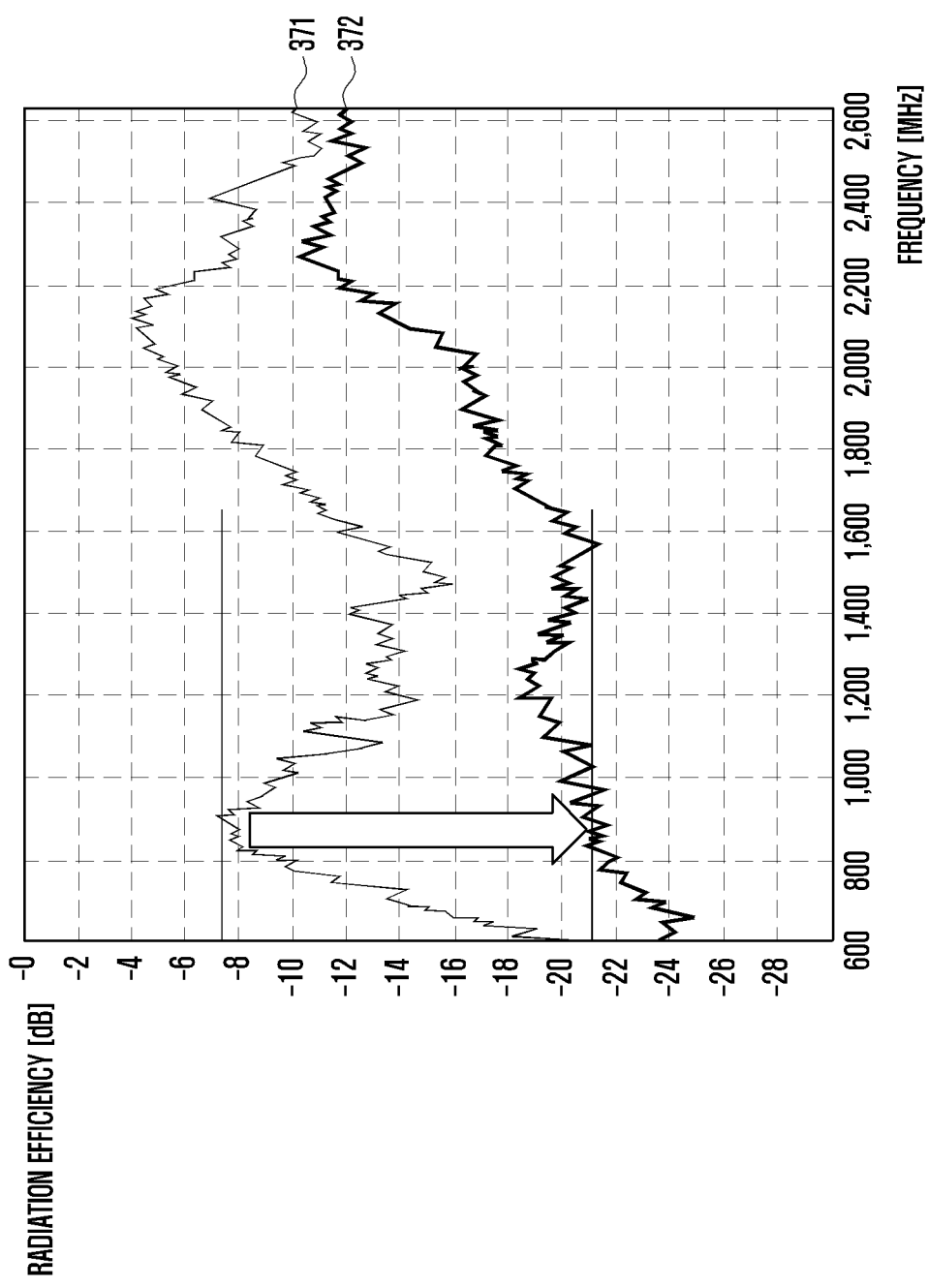
FIG. 3C is a graph showing radiation efficiency versus frequency when a user grips an antenna segment of an electronic device according to an embodiment of the disclosure.

FIG. 3C is a graph showing radiation efficiency versus frequency when a user grips the antenna segment 390 of the electronic device 101 according to an embodiment of the disclosure.

Compared to a conventional bar-type electronic device that includes an antenna at the bottom thereof, the electronic device 101 including a foldable display and/or a foldable housing may include an antenna (e.g., the first antenna 311) on a side surface (e.g., 213a and/or 223a in FIG. 2A) thereof to secure low band antenna performance.

Referring to FIGS. 3B and 3C, when a user grips the antenna segment 390 between the first antenna 311 and the third antenna 313, a ground coupling phenomenon may occur. At this time, the efficiency of radiation power (e.g., transmit (TX) power) through the first antenna 311 may be changed from the first efficiency 371 to the second efficiency 372.

FIG. 4 illustrates antenna switching conditions according to IQ values according to an embodiment of the disclosure.

FIG. 4 is a graph showing an in-phase component and a quadrature phase component of a reflection signal of radiation power (e.g., TX power). For example, an in-phase quadrature phase (IQ) graph is the basis for representing in-phase component and quadrature phase component values, based on an S-parameter S11 of radiation power (e.g., TX power).

In various embodiments, when the IQ (in-phase component and quadrature phase component) value of the reflection signal of the radiation power (e.g., TX power) through the first antenna 311 is at a predetermined point 410 and/or in the predetermined region 420, the electronic device 101 may perform communication by switching the antenna from the first antenna 311 to the second antenna 312. The region 420 may be a region spaced by a predetermined distance from the predetermined point 410.

In various embodiments, a ground coupling phenomenon may occur when a user grips the antenna segment 390 between the first antenna 311 and the third antenna 313. When the ground coupling phenomenon occurs, the IQ value of the reflection signal of the radiation power (e.g., TX power) through the first antenna 311 may be at the predetermined point 410 and/or the predetermined region 420 on the IQ graph.

Figure 5:
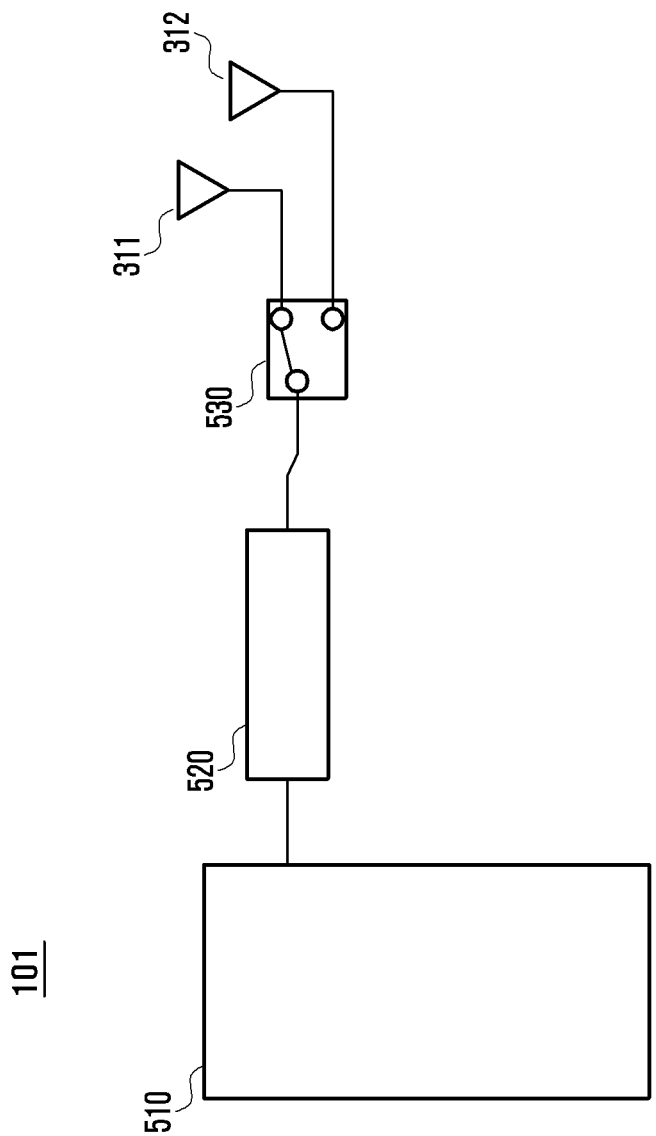
FIG. 5 illustrates a switching operation of an electronic device according to an embodiment of the disclosure.

FIG. 5 illustrates a switching operation of the electronic device 101 according to an embodiment of the disclosure.

In various embodiments, the electronic device 101 may include an RF communication circuit 510 (e.g., a communication processor), a front end module 520 (e.g., a PAMID), a switch 530, a first antenna 311, and a second antenna 312.

In various embodiments, the RF communication circuit 510 may modulate a digital signal to an RF signal or demodulate an RF signal to a digital signal. The RF communication circuit 510 may transmit an RF signal or receive an RF signal from the front end module 520.

In various embodiments, the front end module 520 may be connected to the RF communication circuit 510 and the switch 530. The front end module 520 may include a power amplifier, a duplexer, a filter, and/or a switch. The front end module 520 may be a PAMID.

In various embodiments, the front end module 520 may transfer the RF signal received from the RF communication circuit 510 to the antennas 311 and 312 or transfer the RF signal received from the antennas 311 and 312 to the RF communication circuit 510.

In various embodiments, the switch 530 enables the front end module 520 to be electrically connected to the first antenna 311 or the second antenna 312 under the control of the RF communication circuit 510 and/or a processor 120. The switch 530 may be a single pole double throw (SPDT) switch.

In various embodiments, the RF communication circuit 510 and/or the processor 120 may determine whether to control the switch 530 according to the IQ value of the reflection signal of the radiation power (TX power) when the radiation power (TX power) is equal to or greater than a predetermined magnitude. When the IQ value satisfies the switching condition of the second antenna 312, the switch 530 may cut off the electrical connection with the first antenna 311 and may be electrically connected to the second antenna 312.

Figure 6:
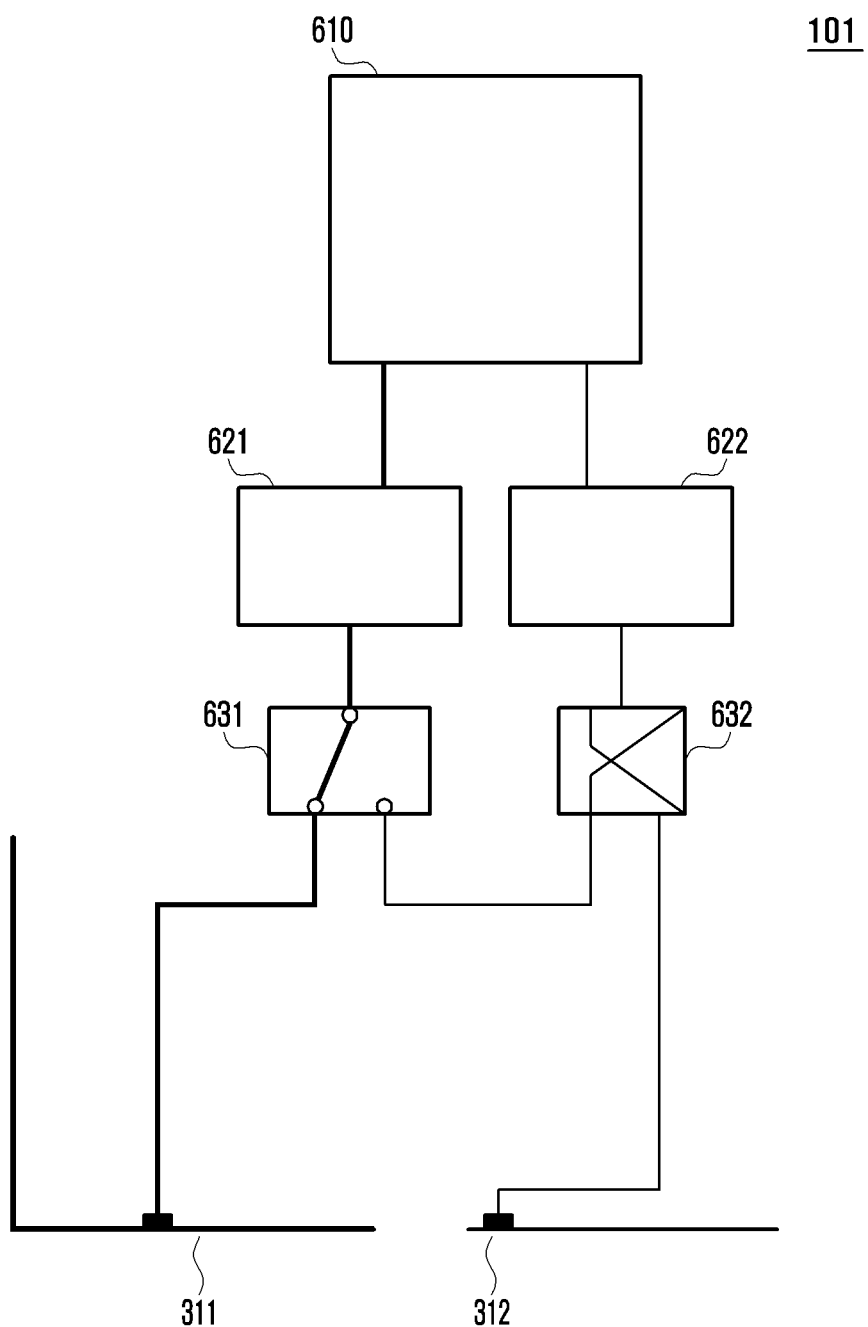
FIG. 6 illustrates a switching operation of an electronic device according to an embodiment of the disclosure.
Figure 7:
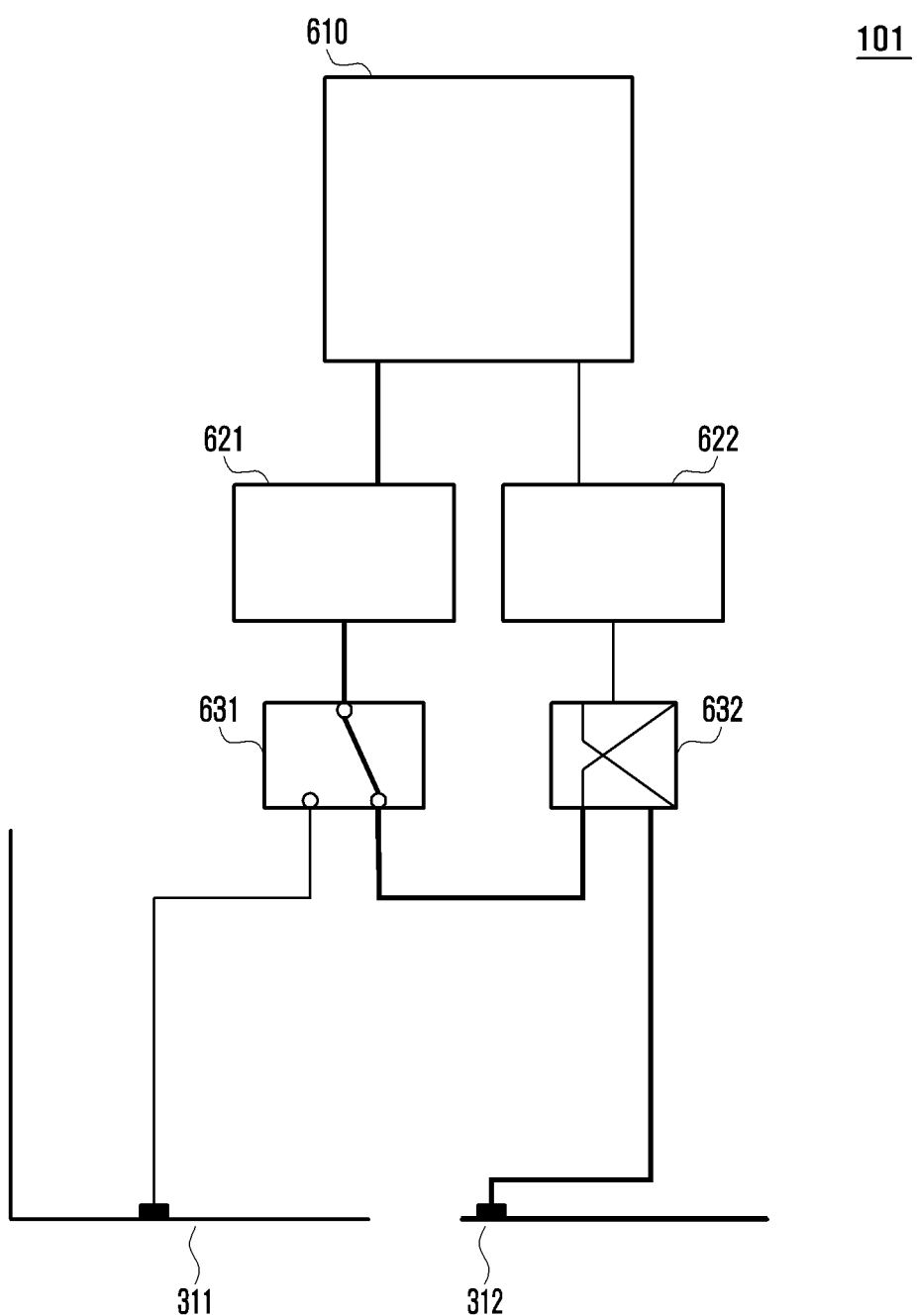
FIG. 7 illustrates a switching operation of an electronic device according to an embodiment of the disclosure.

FIG. 6 illustrates a switching operation of the electronic device 101 according to an embodiment of the disclosure. FIG. 7 illustrates a switching operation of the electronic device 101 according to an embodiment of the disclosure.

Referring to FIGS. 6 and 7, the electronic device 101 may include an RF communication circuit 610 (e.g., a communication processor), a first front end module 621 (e.g., a PAMID), a second front end module 622, a switch 631, a duplexer 632, a first antenna 311, and a second antenna 312.

In various embodiments, the RF communication circuit 610 may modulate a digital signal to an RF signal or demodulate an RF signal to a digital signal. The RF communication circuit 610 may transmit or receive an RF signal from the first front end module 621 and/or the second front end module 622.

In various embodiments, the first front end module 621 may be connected to the RF communication circuit 610 and the switch 631. The second front end module 622 may be connected to the RF communication circuit 610 and the duplexer 632.

In various embodiments, the first front end module 621 and/or the second front end module 622 may include a power amplifier, a duplexer, a filter, and/or a switch. The first front end module 621 and/or the second front end module 622 may be PAMID.

In various embodiments, the first front end module 621 and/or the second front end module 622 may transfer the RF signal received from the RF communication circuit 510 to the antennas 311 and 312 or may transfer the RF signal received from the antennas 311 and 312 to the RF communication circuit 610.

In various embodiments, the switch 631 may allow the front end module 520 to be electrically connected to the first antenna 311 or the duplexer 632 under the control of the RF communication circuit 510 and/or the processor 120. The switch 631 may be a single pole double throw (SPDT) switch.

In FIG. 6, the switch 631 is electrically connected to the first antenna 311.

In various embodiments, the RF communication circuit 610 and/or the processor 120 may determine whether to control the switch 631 according to the IQ value of the reflection signal of the radiation power (TX power) when the radiation power (TX power) is equal to or greater than a predetermined magnitude. When the IQ value does not satisfy the switching condition of the second antenna 312, the switch 631 may maintain an electrical connection with the first antenna 311. When the radiation power (TX power) of the RF communication circuit 610 and/or the processor 120 is equal to or less than a predetermined magnitude, the switch 631 may maintain an electrical connection with the first antenna 311.

In FIG. 7, the switch 631 is electrically connected to the second antenna 312 through the duplexer 632.

In various embodiments, the duplexer 632 may be electrically connected to the switch 631 and the second antenna 312.

In various embodiments, the RF communication circuit 610 and/or the processor 120 may determine whether to control the switch 631 according to the IQ value of the reflection signal of the radiation power (TX power) when the radiation power (TX power) is equal to or greater than a predetermined magnitude. When the IQ value satisfies the switching condition of the second antenna 312, the switch 631 may cut off the electrical connection with the first antenna 311 and may be electrically connected to the duplexer 632 connected to the second antenna 312.

Figure 8:
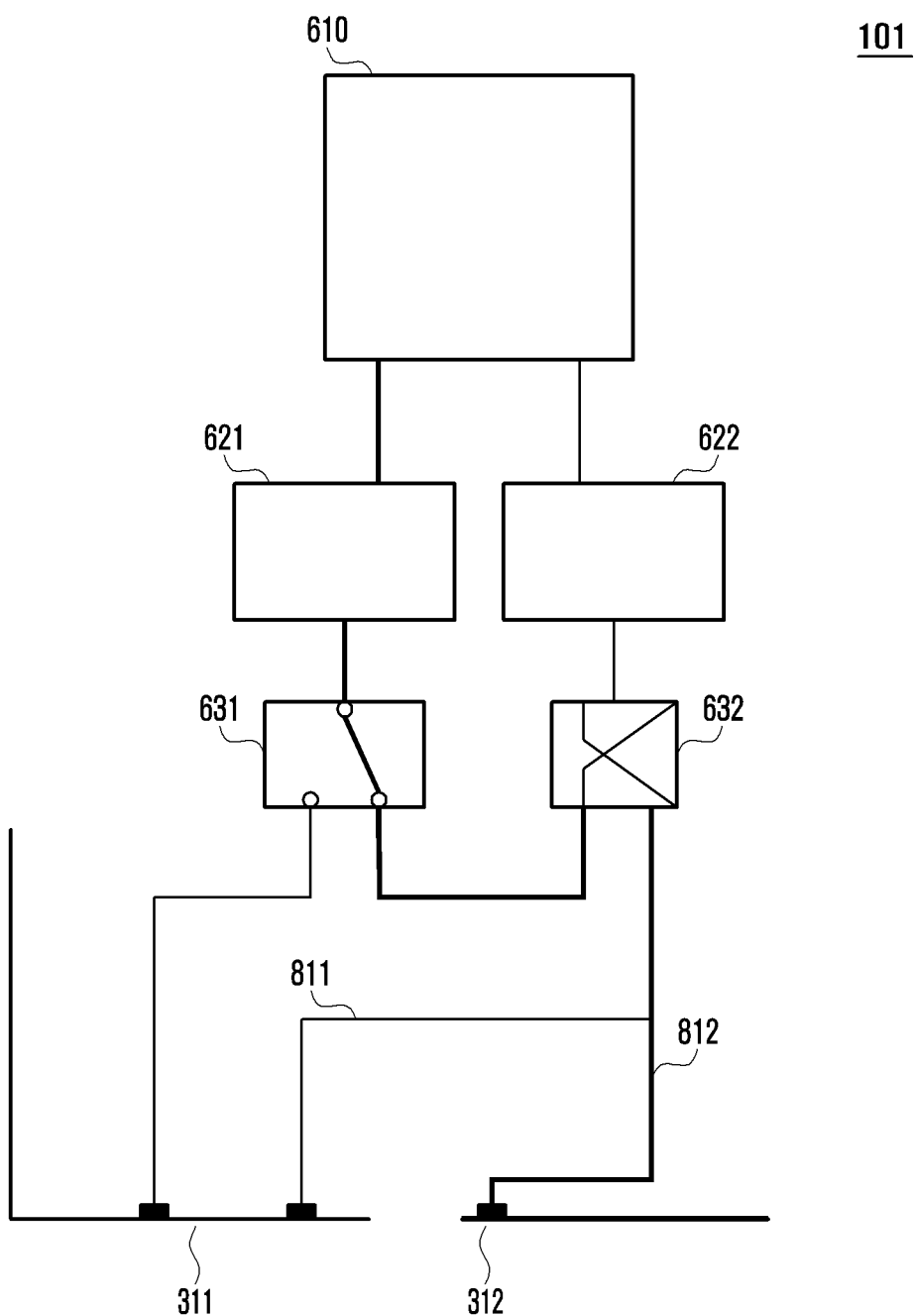
FIG. 8 illustrates a switching operation of an electronic device 101 according to an embodiment of the disclosure.

FIG. 8 illustrates a switching operation of the electronic device 101 according to an embodiment of the disclosure.

The electronic device 101 may include an RF communication circuit 610 (e.g., a communication processor), a first front end module 621 (e.g., a PAMID), a second front end module 622, a switch 631, a duplexer. 632, a first antenna 311, and a second antenna 312.

In various embodiments, the RF communication circuit 610 may modulate a digital signal to an RF signal or demodulate an RF signal to a digital signal. The RF communication circuit 610 may transmit or receive an RF signal from the first front end module 621 and/or the second front end module 622.

In various embodiments, the first front end module 621 may be connected to the RF communication circuit 610 and the switch 631. The second front end module 622 may be connected to the RF communication circuit 610 and the duplexer 632.

In various embodiments, the first front end module 621 and/or the second front end module 622 may include a power amplifier, a duplexer, a filter, and/or a switch. The first front end module 621 and/or the second front end module 622 may be PAMID.

In various embodiments, the first front end module 621 and/or the second front end module 622 may transfer the RF signal received from the RF communication circuit 510 to the antennas 311 and 312 or may transfer the RF signal received from the antenna 311 and 312 to the RF communication circuit 610.

In various embodiments, the switch 631 may allow the front end module 520 to be electrically connected to the first antenna 311 or the duplexer 632 under the control of the RF communication circuit 510 and/or the processor 120. The switch 631 may be a single pole double throw (SPDT) switch.

The switch 631 may be electrically connected to the first antenna 311 and the second antenna 312 through the duplexer 632.

In various embodiments, the duplexer 632 may be electrically connected to the switch 631, the first antenna 311, and the second antenna 312.

The duplexer 632 may be connected to the first antenna 311 through a first connection line 811 and electrically connected to the second antenna 312 through a second connection line 812.

In various embodiments, the RF communication circuit 610 and/or the processor 120 may determine whether to control the switch 631 according to the IQ value of the reflection signal of the radiation power (TX power) when the radiation power (TX power) is equal to or greater than a predetermined magnitude. When the IQ value satisfies the switching condition of the switch 631, the switch 631 may cut off the electrical connection with the first antenna 311 and may be electrically connected to the duplexer 632 which is connected to the first antenna 311 and the second antenna 312. When the IQ value of the reflection signal of the radiation power (TX power) through the first antenna 311 satisfies the switching condition of the switch 631, the switch 631 may be connected to the duplexer 632, and the electronic device 101 may perform communication through the first antenna 311 and the second antenna 312.

Figure 9:
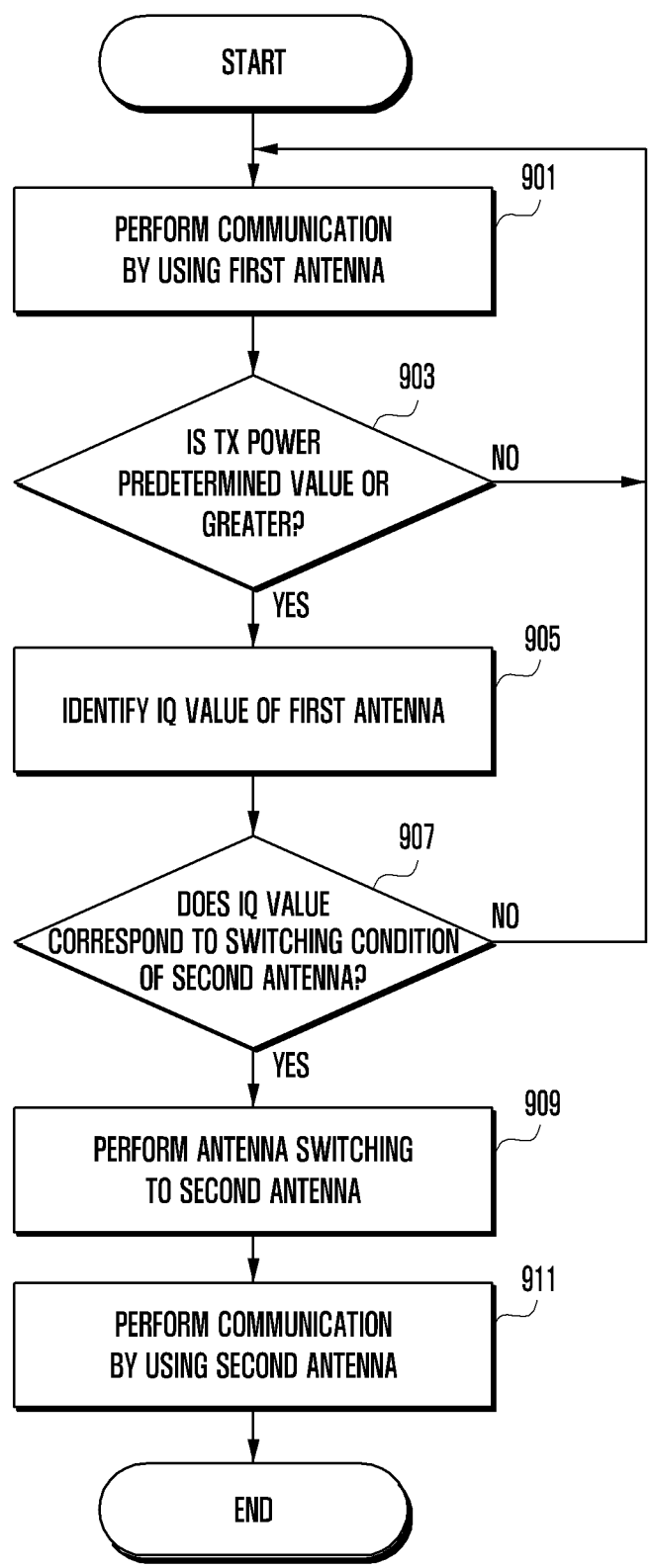
FIG. 9 is a flowchart illustrating an antenna switching operation of an electronic device according to an embodiment of the disclosure.

FIG. 9 is a flowchart illustrating an antenna switching operation of the electronic device 101 according to an embodiment of the disclosure.

In various embodiments, the electronic device 101 may perform communication by using the first antenna 311 in operation 901 under the control of the RF communication circuit 510, 610, and/or the processor 120. The electronic device 101 may allow the switch 530, 631 to be electrically connected to the first switch so that communication may be performed using the first antenna 311.

In various embodiments, the electronic device 101 may determine in operation 903 under the control of the RF communication circuit 510, 610, and/or the processor 120 whether the radiation power (or TX power) through the first antenna 311 is a predetermined value or greater.

In various embodiments, the electronic device 101 may proceed to operation 905 when the radiation power (or TX power) through the first antenna 311 is the predetermined value or greater.

In various embodiments, the electronic device 101 may proceed to operation 901 when the radiation power (or TX power) through the first antenna 311 is less than the predetermined value.

In various embodiments, the electronic device 101 may identify the IQ value of the first antenna 311 in operation 905 under the control of the RF communication circuit 510, 610, and/or the processor 120.

In various embodiments, the electronic device 101, in operation 907 under the control of the RF communication circuit 510, 610, and/or the processor 120, may identify whether the IQ value of the first antenna 311 corresponds to the condition of the second antenna 312.

In various embodiments, when the IQ value of the first antenna 311 corresponds to the condition of the second antenna 312, the electronic device 101 may proceed to operation 909.

In various embodiments, when the IQ value of the first antenna 311 does not correspond to the condition of the second antenna 312, the electronic device 101 may proceed to operation 901.

In various embodiments, the electronic device 101 may determine whether the IQ (in-phase component and quadrature phase component) value of the reflection signal of the radiation power (e.g., TX power) through the first antenna 311 corresponds to the switching condition of the second antenna 312.

In various embodiments, when, on the IQ graph, the IQ (in-phase component and quadrature phase component) value of the reflection signal of the radiation power (e.g., TX power) through the first antenna 311 is at a predetermined point (e.g., 410 in FIG. 4) and/or a predetermined region (e.g., 420 in FIG. 4), the electronic device 101 may determine that the condition for antenna switching from the first antenna 311 to the second antenna 312 is satisfied. The predetermined region may be a region spaced by a predetermined distance from the predetermined point.

In various embodiments, when, on the IQ graph, the IQ (in-phase component and quadrature phase component) value of the reflection signal of the radiation power (e.g., TX power) through the first antenna 311 is out of the predetermined point (e.g., 410 in FIG. 4) and/or the predetermined region (e.g., 420 in FIG. 4), the electronic device 101 may determine that communication is performed using the first antenna 311.

In various embodiments, when the IQ (in-phase component and quadrature phase component) value of the reflection signal of the radiation power (e.g., TX power) through the first antenna 311 corresponds to a predetermined range, the electronic device 101 may determine that the condition for antenna switching from the first antenna 311 to the second antenna 312 is satisfied.

In various embodiments, the IQ (in-phase component and quadrature phase component) value of the reflection signal of the radiation power (e.g., TX power) through the first antenna 311 does not correspond to the predetermined range, the electronic device 101 may determine that the condition for antenna switching from the first antenna 311 to the second antenna 312 is not satisfied.

In various embodiments, the IQ (in-phase component and quadrature phase component) value of the reflection signal of the radiation power (e.g., TX power) through the first antenna 311 may be measured by the RF communication circuit 510, 610, and/or the processor 120.

In various embodiments, the electronic device 101 may store information on the switching IQ value or the switching condition of the second antenna 312 in the memory 130 and compare the IQ value of the reflection signal of the radiation power (e.g., TX power) through the first antenna 311 with the condition stored in the memory 130 to determine whether the IQ value corresponds to the switching condition of the second antenna 312.

In various embodiments, the electronic device 101, in operation 909 under the control of the RF communication circuit 510, 610, and/or the processor 120, may control the switch 530, 631 to enable electrical connection with the second antenna 312. At this time, the electronic device 101 may cut off the electrical connection with the first antenna 311.

In various embodiments, the electronic device 101 may perform communication by using the second antenna 312 in operation 911 under the control of the RF communication circuit 510, 610, and/or the processor 120.

Figure 10:
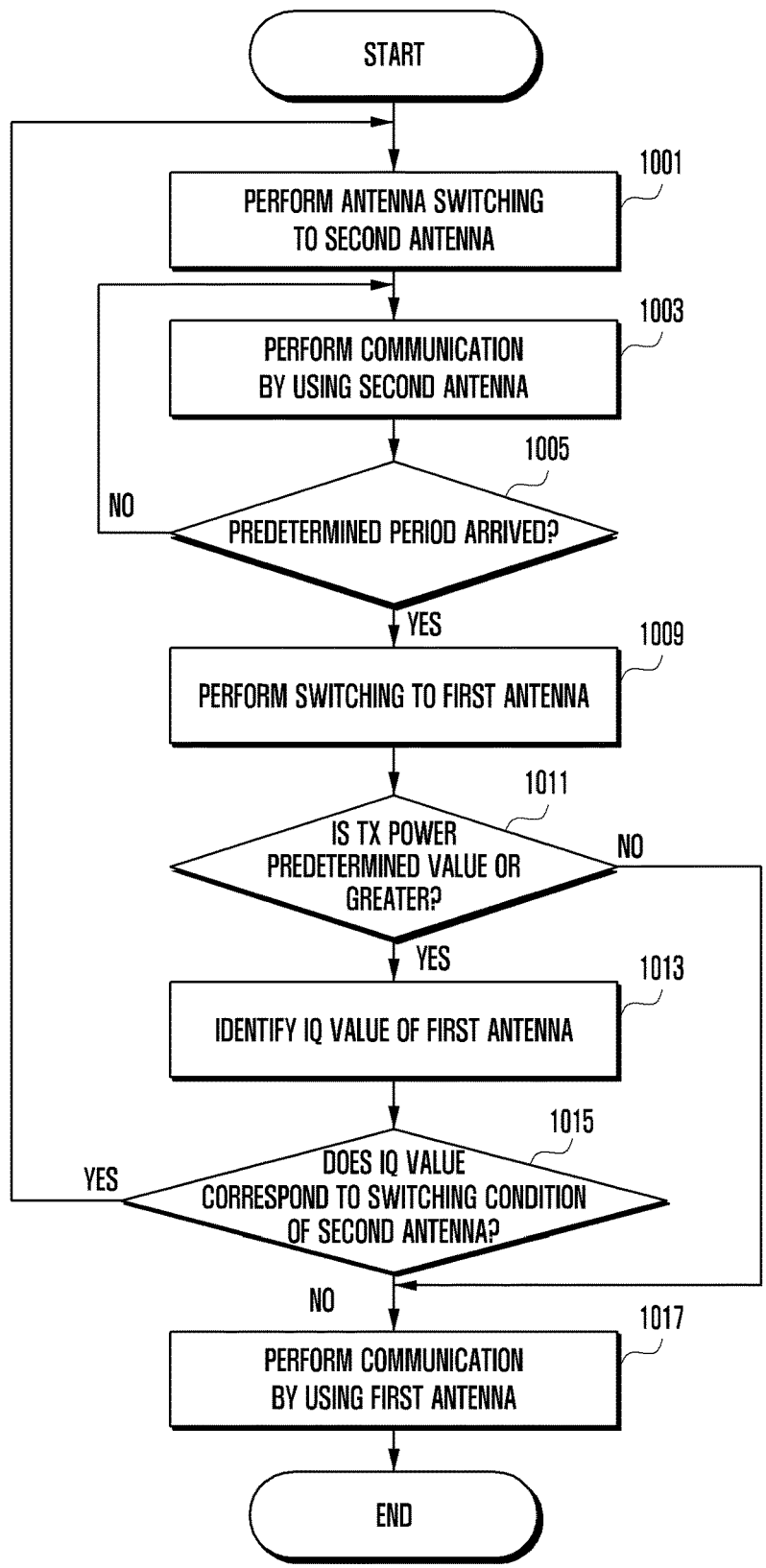
FIG. 10 is a flowchart illustrating an antenna switching operation of an electronic device according to an embodiment of the disclosure.

FIG. 10 is a flowchart illustrating an antenna switching operation of the electronic device 101 according to an embodiment of the disclosure.

In various embodiments, the electronic device 101, in operation 1001 under the control of the RF communication circuit 510, 610, and/or the processor 120, may control the switch 530, 631 to enable electrical connection with the second antenna 312. At this time, the electronic device 101 may cut off the electrical connection with the first antenna 311.

In various embodiments, the electronic device 101 may perform communication by using the second antenna 312 in operation 1003 under the control of the RF communication circuit 510, 610, and/or the processor 120.

In various embodiments, the electronic device 101 may determine in operation 1005 under the control of the RF communication circuit 510, 610, and/or the processor 120 whether a predetermined period has arrived. The predetermined period may be, for example, 2 seconds or 3 seconds.

In various embodiments, the electronic device 101 may proceed to operation 1009 when the predetermined period has arrived during a communication operation using the second antenna 312.

In various embodiments, the electronic device 101 may proceed to operation 1003 when the predetermined period does not arrive during the communication operation using the second antenna 312.

In various embodiments, the electronic device 101, in operation 1009 under the control of the RF communication circuit 510, 610, and/or the processor 120, may perform switching to the first antenna 311 when the predetermined period has arrived.

In various embodiments, when a predetermined period has arrived, the electronic device 101, in operation 1009 under the control of the RF communication circuit 510, 610, and/or the processor 120, may control the switch 530, 631 to enable electrical connection with the first antenna 311. At this time, the electronic device 101 may cut off the electrical connection with the second antenna 312.

In various embodiments, the electronic device 101, in in operation 1011 under the control of the RF communication circuit 510, 610, and/or the processor 120, may determine whether the radiation power (or TX power) through the first antenna 311 is a predetermined value or greater.

In various embodiments, the electronic device 101, under the control of the RF communication circuit 510, 610, and/or the processor 120, may proceed to operation 1013 when the radiation power (or TX power) through the first antenna 311 is the predetermined value or greater.

In various embodiments, the electronic device 101, under the control of the RF communication circuit 510, 610, and/or the processor 120, may proceed to operation 1017 when the radiation power (or TX power) through the first antenna 311 is less than the predetermined value.

In various embodiments, the electronic device 101 may identify the IQ value of the first antenna 311 in operation 1013 under the control of the RF communication circuit 510, 610, and/or the processor 120.

In various embodiments, the electronic device 101, in operation 1015 under the control of the RF communication circuit 510, 610, and/or the processor 120, may identify whether the IQ value of the first antenna 311 corresponds to the condition of the second antenna 312.

In various embodiments, when the IQ value of the first antenna 311 corresponds to the condition of the second antenna 312, the electronic device 101 may proceed to operation 1001.

In various embodiments, when the IQ value of the first antenna 311 does not correspond to the condition of the second antenna 312, the electronic device 101 may proceed to operation 1017.

In various embodiments, the electronic device 101 may determine whether the IQ (in-phase component and quadrature phase component) value of the reflection signal of the radiation power (e.g., TX power) through the first antenna 311 corresponds to the switching condition of the second antenna 312.

In various embodiments, when, on the IQ graph, the IQ (in-phase component and quadrature phase component) value of the reflection signal of the radiation power (e.g., TX power) through the first antenna 311 is at a predetermined point (e.g., 410 in FIG. 4) and/or a predetermined region (e.g., 420 in FIG. 4), the electronic device 101 may determine that the condition for antenna switching from the first antenna 311 to the second antenna 312 is satisfied. The predetermined region may be a region spaced by a predetermined distance from the predetermined point.

In various embodiments, when, on the IQ graph, the IQ (in-phase component and quadrature phase component) value of the reflection signal of the radiation power (e.g., TX power) through the first antenna 311 is out of the predetermined point (e.g., 410 in FIG. 4) and/or the predetermined region (e.g., 420 in FIG. 4), the electronic device 101 may determine that communication is performed using the first antenna 311.

In various embodiments, when the IQ (in-phase component and quadrature phase component) value of the reflection signal of the radiation power (e.g., TX power) through the first antenna 311 corresponds to a predetermined range, the electronic device 101 may determine that the condition for antenna switching from the first antenna 311 to the second antenna 312 is satisfied.

In various embodiments, when the IQ (in-phase component and quadrature phase component) value of the reflection signal of the radiation power (e.g., TX power) through the first antenna 311 does not correspond to the predetermined range, the electronic device 101 may determine that communication is performed using the first antenna 311.

In various embodiments, the IQ (in-phase component and quadrature phase component) value of the reflection signal of the radiation power (e.g., TX power) through the first antenna 311 may be measured by the RF communication circuit 510, 610, and/or the processor 120.

In various embodiments, the electronic device 101 may store information on the switching IQ value or the switching condition of the second antenna 312 in the memory 130 and compare the IQ value of the reflection signal of the radiation power (e.g., TX power) through the first antenna 311 with the condition stored in the memory 130 to determine whether the IQ value corresponds to the switching condition of the second antenna 312.

In various embodiments, the electronic device 101 may perform communication by using the first antenna 311 in operation 1017 under the control of the RF communication circuit 510, 610, and/or the processor 120.

Figure 11:
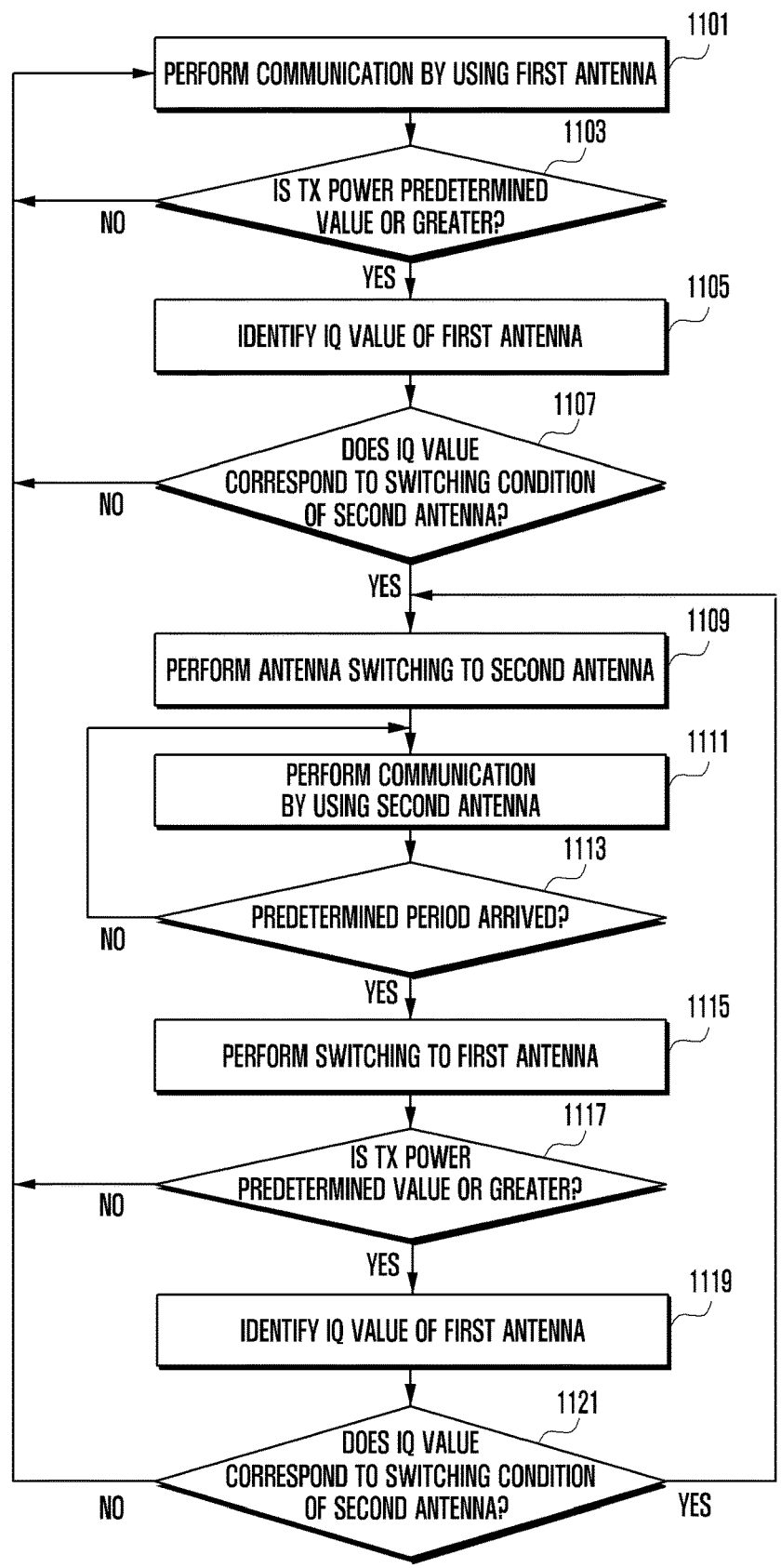
FIG. 11 is a flowchart illustrating an antenna switching operation of an electronic device according to an embodiment of the disclosure.

FIG. 11 is a flowchart illustrating an antenna switching operation of the electronic device 101 according to an embodiment of the disclosure.

In various embodiments, the electronic device 101 may perform communication by using the first antenna 311 in operation 1101 under the control of the RF communication circuit 510, 610, and/or the processor 120. The electronic device 101 may allow the switch 530, 631 to be electrically connected to the first switch so that communication may be performed using the first antenna 311.

In various embodiments, the electronic device 101 may determine in operation 1103 under the control of the RF communication circuit 510, 610, and/or the processor 120 whether the radiation power (or TX power) through the first antenna 311 is a predetermined value or greater.

In various embodiments, the electronic device 101 may proceed to operation 1105 when the radiation power (or TX power) through the first antenna 311 is the predetermined value or greater.

In various embodiments, the electronic device 101 may proceed to operation 1101 when the radiation power (or TX power) through the first antenna 311 is less than the predetermined value.

In various embodiments, the electronic device 101 may identify the IQ value of the first antenna 311 in operation 1105 under the control of the RF communication circuit 510, 610, and/or the processor 120.

In various embodiments, the electronic device 101, in operation 1107 under the control of the RF communication circuit 510, 610, and/or the processor 120, may identify whether the IQ value of the first antenna 311 corresponds to the condition of the second antenna 312.

In various embodiments, when the IQ value of the first antenna 311 corresponds to the condition of the second antenna 312, the electronic device 101 may proceed to operation 1109.

In various embodiments, when the IQ value of the first antenna 311 does not correspond to the condition of the second antenna 312, the electronic device 101 may proceed to operation 1101.

In various embodiments, the electronic device 101 may determine whether the IQ (in-phase component and quadrature phase component) value of the reflection signal of the radiation power (e.g., TX power) through the first antenna 311 corresponds to the switching condition of the second antenna 312.

In various embodiments, when, on the IQ graph, the IQ (in-phase component and quadrature phase component) value of the reflection signal of the radiation power (e.g., TX power) through the first antenna 311 is at a predetermined point (e.g., 410 in FIG. 4) and/or a predetermined region (e.g., 420 in FIG. 4), the electronic device 101 may determine that the condition for antenna switching from the first antenna 311 to the second antenna 312 is satisfied. The predetermined region may be a region spaced by a predetermined distance from the predetermined point.

In various embodiments, when, on the IQ graph, the IQ (in-phase component and quadrature phase component) value of the reflection signal of the radiation power (e.g., TX power) through the first antenna 311 is out of the predetermined point (e.g., 410 in FIG. 4) and/or the predetermined region (e.g., 420 in FIG. 4), the electronic device 101 may determine that communication is performed using the first antenna 311.

In various embodiments, when the IQ (in-phase component and quadrature phase component) value of the reflection signal of the radiation power (e.g., TX power) through the first antenna 311 corresponds to a predetermined range, the electronic device 101 may determine that the condition for antenna switching from the first antenna 311 to the second antenna 312 is satisfied.

In various embodiments, when the IQ (in-phase component and quadrature phase component) value of the reflection signal of the radiation power (e.g., TX power) through the first antenna 311 does not correspond to the predetermined range, the electronic device 101 may determine that the communication is performed using the first antenna 311.

In various embodiments, the IQ (in-phase component and quadrature phase component) value of the reflection signal of the radiation power (e.g., TX power) through the first antenna 311 may be measured by the RF communication circuit 510, 610, and/or the processor 120.

In various embodiments, the electronic device 101 may store information on the switching IQ value or the switching condition of the second antenna 312 in the memory 130 and compare the IQ value of the reflection signal of the radiation power (e.g., TX power) through the first antenna 311 with the condition stored in the memory 130 to determine whether the IQ value corresponds to the switching condition of the second antenna 312.

In various embodiments, the electronic device 101, in operation 1109 under the control of the RF communication circuit 510, 610, and/or the processor 120, may control the switch 530, 631 to enable electrical connection with the second antenna 312. At this time, the electronic device 101 may cut off the electrical connection with the first antenna 311.

In various embodiments, the electronic device 101 may perform communication by using the second antenna 312 in operation 1111 under the control of the RF communication circuit 510, 610, and/or the processor 120.

In various embodiments, the electronic device 101 may determine in operation 1113 under the control of the RF communication circuit 510, 610, and/or the processor 120 whether a predetermined period has arrived. The predetermined period may be, for example, 2 seconds or 3 seconds.

In various embodiments, the electronic device 101 may proceed to operation 1115 when the predetermined period has arrived during a communication operation using the second antenna 312.

In various embodiments, the electronic device 101 may proceed to operation 1111 when the predetermined period does not arrive during the communication operation using the second antenna 312.

In various embodiments, the electronic device 101, in operation 1115 under the control of the RF communication circuit 510, 610, and/or the processor 120, may perform switching to the first antenna 311 when the predetermined period has arrived.

In various embodiments, when a predetermined period has arrived, the electronic device 101, in operation 1115 under the control of the RF communication circuit 510, 610, and/or the processor 120, may control the switch 530, 631 to enable electrical connection with the first antenna 311. At this time, the electronic device 101 may cut off the electrical connection with the second antenna 312.

In various embodiments, the electronic device 101, in in operation 1117 under the control of the RF communication circuit 510, 610, and/or the processor 120, may determine whether the radiation power (or TX power) through the first antenna 311 is a predetermined value or greater.

In various embodiments, the electronic device 101, under the control of the RF communication circuit 510, 610, and/or the processor 120, may proceed to operation 1119 when the radiation power (or TX power) through the first antenna 311 is the predetermined value or greater.

In various embodiments, the electronic device 101, under the control of the RF communication circuit 510, 610, and/or the processor 120, may proceed to operation 1101 when the radiation power (or TX power) through the first antenna 311 is less than the predetermined value.

In various embodiments, the electronic device 101 may identify the IQ value of the first antenna 311 in operation 1119 under the control of the RF communication circuit 510, 610, and/or the processor 120.

In various embodiments, the electronic device 101, in operation 1121 under the control of the RF communication circuit 510, 610, and/or the processor 120, may identify whether the IQ value of the first antenna 311 corresponds to the condition of the second antenna 312.

In various embodiments, when the IQ value of the first antenna 311 corresponds to the condition of the second antenna 312, the electronic device 101 may proceed to operation 1109.

In various embodiments, when the IQ value of the first antenna 311 does not correspond to the condition of the second antenna 312, the electronic device 101 may proceed to operation 1101.

In various embodiments, the electronic device 101 may determine whether the IQ (in-phase component and quadrature phase component) value of the reflection signal of the radiation power (e.g., TX power) through the first antenna 311 corresponds to the switching condition of the second antenna 312.

In various embodiments, when, on the IQ graph, the IQ (in-phase component and quadrature phase component) value of the reflection signal of the radiation power (e.g., TX power) through the first antenna 311 is at a predetermined point (e.g., 410 in FIG. 4) and/or a predetermined region (e.g., 420 in FIG. 4), the electronic device 101 may determine that the condition for antenna switching from the first antenna 311 to the second antenna 312 is satisfied. The predetermined region may be a region spaced by a predetermined distance from the predetermined point.

In various embodiments, when, on the IQ graph, the IQ (in-phase component and quadrature phase component) value of the reflection signal of the radiation power (e.g., TX power) through the first antenna 311 is out of the predetermined point (e.g., 410 in FIG. 4) and/or the predetermined region (e.g., 420 in FIG. 4), the electronic device 101 may determine that communication is performed using the first antenna 311.

In various embodiments, when the IQ (in-phase component and quadrature phase component) value of the reflection signal of the radiation power (e.g., TX power) through the first antenna 311 corresponds to a predetermined range, the electronic device 101 may determine that the condition for antenna switching from the first antenna 311 to the second antenna 312 is satisfied.

In various embodiments, when the IQ (in-phase component and quadrature phase component) value of the reflection signal of the radiation power (e.g., TX power) through the first antenna 311 does not correspond to the predetermined range, the electronic device 101 may determine that communication is performed using the first antenna 311.

In various embodiments, the IQ (in-phase component and quadrature phase component) value of the reflection signal of the radiation power (e.g., TX power) through the first antenna 311 may be measured by the RF communication circuit 510, 610, and/or the processor 120.

In various embodiments, the electronic device 101 may store information on the switching IQ value or the switching condition of the second antenna 312 in the memory 130 and compare the IQ value of the reflection signal of the radiation power (e.g., TX power) through the first antenna 311 with the condition stored in the memory 130 to determine whether the IQ value corresponds to the switching condition of the second antenna 312.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A foldable electronic device comprising a plurality of housings, the electronic device comprising:
   a first antenna included in a first side surface of a housing and a portion of a second side surface of the housing;
   a second antenna segmented from the first antenna and included in the second side surface;
   a switch selectively coupled to the first antenna and the second antenna;
   a front end module connected to the switch; and
   a radio frequency (RF) communication circuit configured to transmit an RF signal to the first antenna and the second antenna or receive an RF signal through the first antenna and the second antenna,
   wherein the RF communication circuit is configured to:
      perform control such that communication is performed using the first antenna,
      determine whether radiation power through the first antenna is equal to or greater than a predetermined value,
      in case that the radiation power through the first antenna is greater than or equal to the predetermined value, identify an in-phase quadrature phase (IQ) value of the first antenna,
      determine whether the IQ value corresponds to a switching condition of the second antenna, and
      in case that the IQ value corresponds to the switching condition of the second antenna, perform switching from the first antenna to the second antenna.

2. The electronic device of claim 1, wherein the RF communication circuit is configured to perform communication by using the second antenna in case that switching to the second antenna is done.

3. The electronic device of claim 2, wherein the RF communication circuit is configured to:
   determine whether a predetermined period has arrived,
   in case that the predetermined period has arrived, perform control such that switching to the first antenna is performed,
   determine whether radiation power through the first antenna is equal to or greater than the predetermined value,
   in case that the radiation power through the first antenna is equal to or greater than the predetermined value, identify an IQ value of the first antenna,
   determine whether the IQ value corresponds to the switching condition of the second antenna,
   in case that the IQ value corresponds to the switching condition of the second antenna, perform switching from the first antenna to the second antenna,
   in case that the predetermined period has not been arrived, perform communication by using the second antenna, and
   in case that the IQ value does not correspond to the switching condition of the second antenna, perform communication by using the first antenna.

4. The electronic device of claim 1, wherein the RF communication circuit is configured to perform communication by using the first antenna in case that radiation power through the first antenna is less than the predetermined value.

5. The electronic device of claim 1, wherein the RF communication circuit is configured to perform communication by using the first antenna in case that the IQ value does not correspond to the switching condition of the second antenna.

6. The electronic device of claim 1, wherein the IQ value is an in-phase component and quadrature phase component value, based on an S-parameter S11 of radiation power of the first antenna.

7. The electronic device of claim 1, further comprising:
   a memory,
   wherein the memory is configured to store information on the switching condition of the second antenna, and
   wherein the RF communication circuit is further configured to compare the identified IQ value and the condition stored in the memory to determine whether the IQ value corresponds to the switching condition of the second antenna.

8. A method for operating an antenna of an electronic device, the method comprising:
   performing control such that communication is performed using a first antenna;
   determining whether radiation power through the first antenna is greater than or equal to a predetermined value;
   identifying an in-phase quadrature phase (IQ) value of the first antenna in case that the radiation power through the first antenna is equal to or greater than the predetermined value;
   determining whether the IQ value corresponds to a switching condition of a second antenna; and
   performing switching from the first antenna to the second antenna in case that the IQ value corresponds to the switching condition of the second antenna.

9. The method of claim 8, further comprising:
   performing communication by using the second antenna in case that switching to the second antenna is done.

10. The method of claim 9, further comprising:
   determining whether a predetermined period has arrived;
   in case that the predetermined period has arrived, performing control such that switching to the first antenna is performed;
   determining whether radiation power through the first antenna is equal to or greater than the predetermined value;
   in case that the radiation power through the first antenna is equal to or greater than the predetermined value, identifying an IQ value of the first antenna;
   determining whether the IQ value corresponds to the switching condition of the second antenna;
   in case that the IQ value corresponds to the switching condition of the second antenna, performing switching from the first antenna to the second antenna;
   in case that the predetermined period has not been arrived, performing communication by using the second antenna; and
   in case that the IQ value does not correspond to the switching condition of the second antenna, performing communication by using the first antenna.

11. The method of claim 8, further comprising:
performing communication by using the first antenna in case that radiation power through the first antenna is less than the predetermined value.

12. The method of claim 8, further comprising:
performing communication by using the first antenna in case that the IQ value does not correspond to the switching condition of the second antenna.

13. The method of claim 8, wherein the IQ value is an in-phase component and quadrature phase component value, based on an S-parameter S11 of radiation power of the first antenna.

14. The method of claim 8, further comprising:
storing information on the switching condition of the second antenna in a memory.

15. The method of claim 14, wherein the determining whether the IQ value corresponds to the switching condition of the second antenna further comprises comparing the identified IQ value and the information stored in the memory to determine whether the IQ value corresponds to the switching condition of the second antenna.

* * * * *